C. H. WOLFE AND H. G. ALLEN.
CHECK WRITING AND NUMBERING MACHINE.
APPLICATION FILED JUNE 5, 1920.

1,366,620.

Patented Jan. 25, 1921.
4 SHEETS—SHEET 1.

Inventor
C. H. Wolfe,
H. G. Allen,
By Munn & Co.
Attorneys

C. H. WOLFE AND H. G. ALLEN.
CHECK WRITING AND NUMBERING MACHINE.
APPLICATION FILED JUNE 5, 1920.

1,366,620.

Patented Jan. 25, 1921.
4 SHEETS—SHEET 4.

Inventor
C. H. Wolfe,
H. G. Allen,

By Munn & Co.
Attorney

UNITED STATES PATENT OFFICE.

CHARLES HAMILTON WOLFE AND HARRY GEORGE ALLEN, OF SEATTLE, WASHINGTON.

CHECK WRITING AND NUMBERING MACHINE.

1,366,620.  Specification of Letters Patent.  Patented Jan. 25, 1921.

Application filed June 5, 1920. Serial No. 386,812.

*To all whom it may concern:*

Be it known that we, CHARLES HAMILTON WOLFE and HARRY GEORGE ALLEN, citizens of the United States, and residents of Seattle, in the county of King and State of Washington, have invented certain new and useful Improvements in Check Writing and Numbering Machines, of which the following is a specification.

Our present invention relates generally to machines for writing and numbering checks and more particularly to a machine by means of which the amount and number of the check as well as the name of the payor may be filled in in such manner as to successfully defeat erasure and change, where as is usual the payee's name and the amount of the check in numerals occur in the same horizontal line, our object being the provision of a simple inexpensive apparatus which will be effective and efficient, which is readily adjustable, which will be strong and durable, and which will emboss as well as print for the above purposes.

These general objects and certain other objects and advantages residing for the most part in details of construction, we preferably carry out by the means to be now described with respect to the accompanying drawings, forming a part of this specification, and in which, Figure 1 is a vertical transverse section through our apparatus complete, Fig. 2 is a horizontal section therethrough, Fig. 3 is a front elevation, partly broken away and in section, Fig. 4 is a detail vertical section taken substantially on line 4—4 of Fig. 1.

Figure 1:
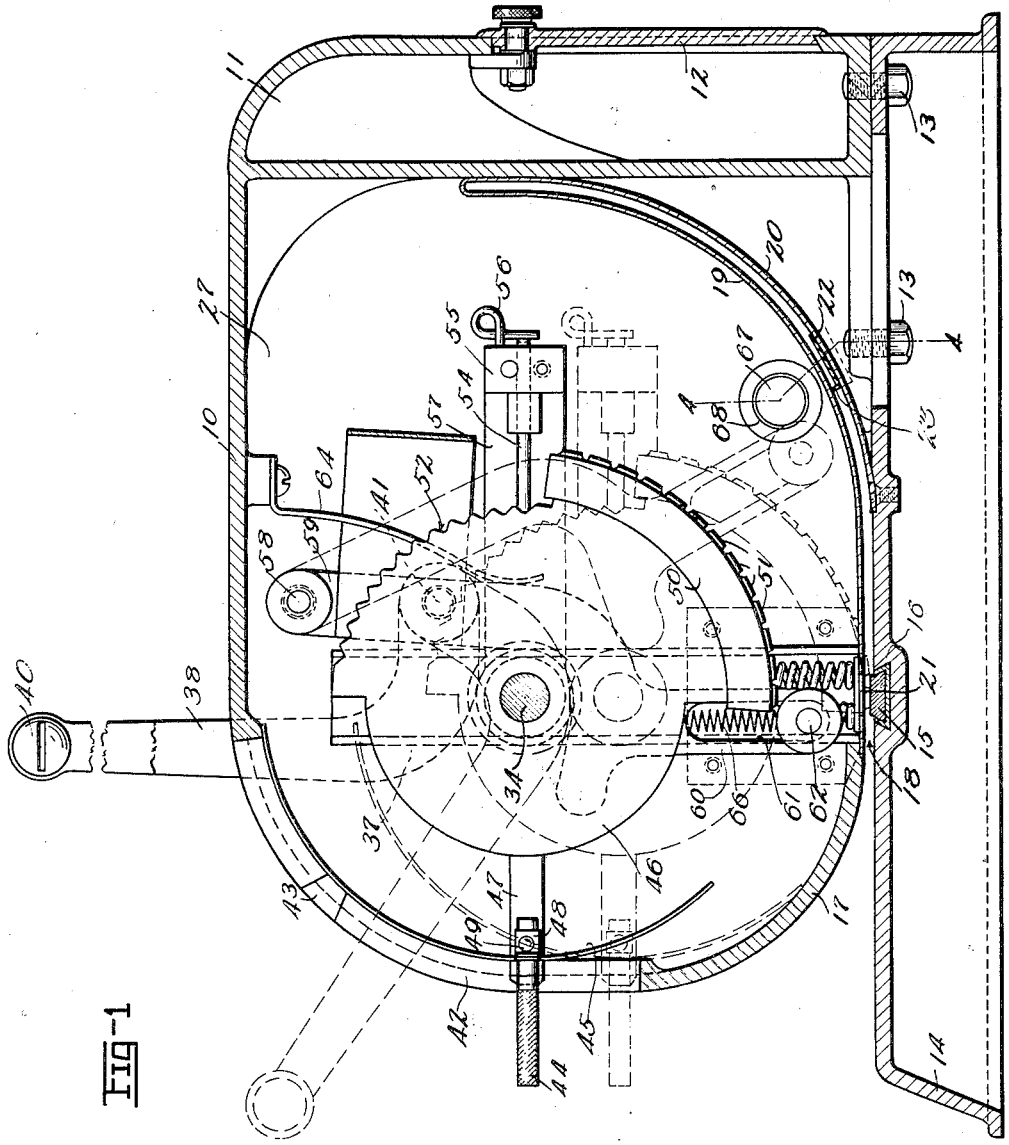
Figure 2:
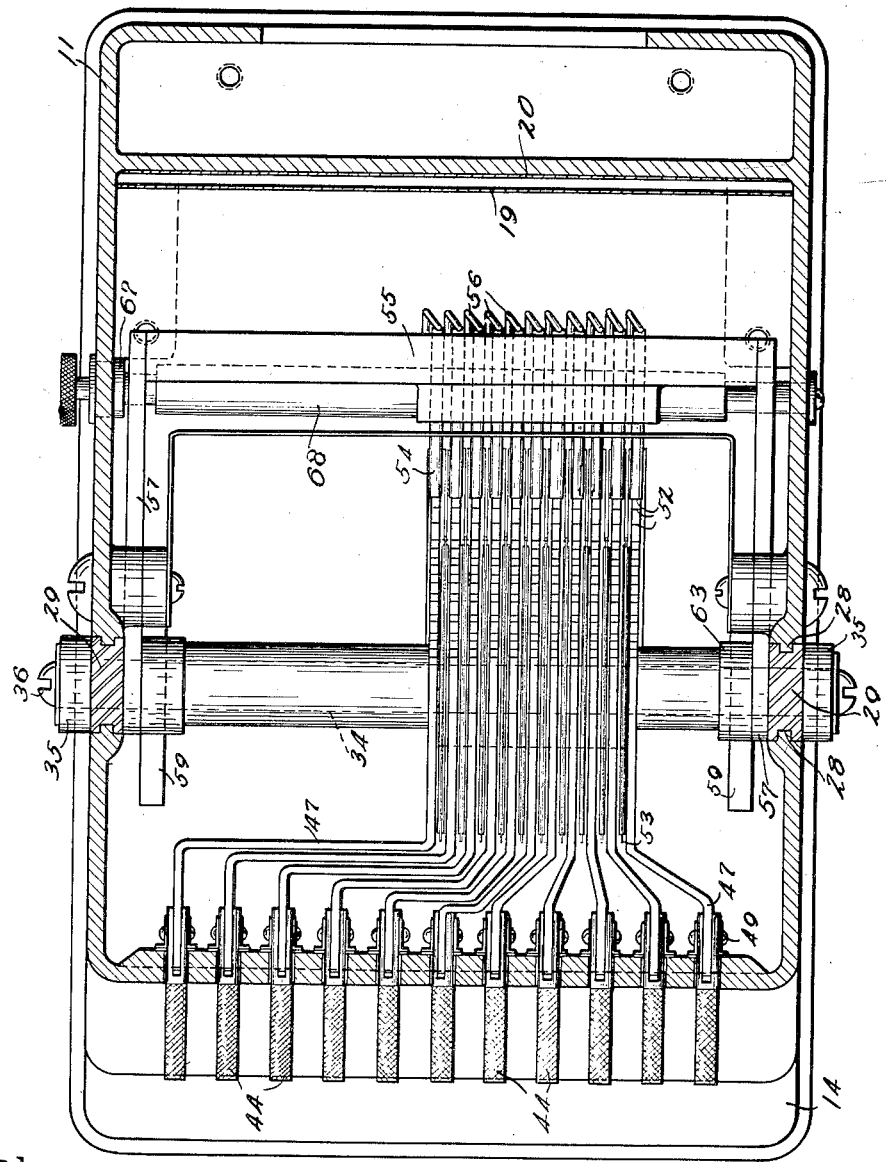
Figure 3:
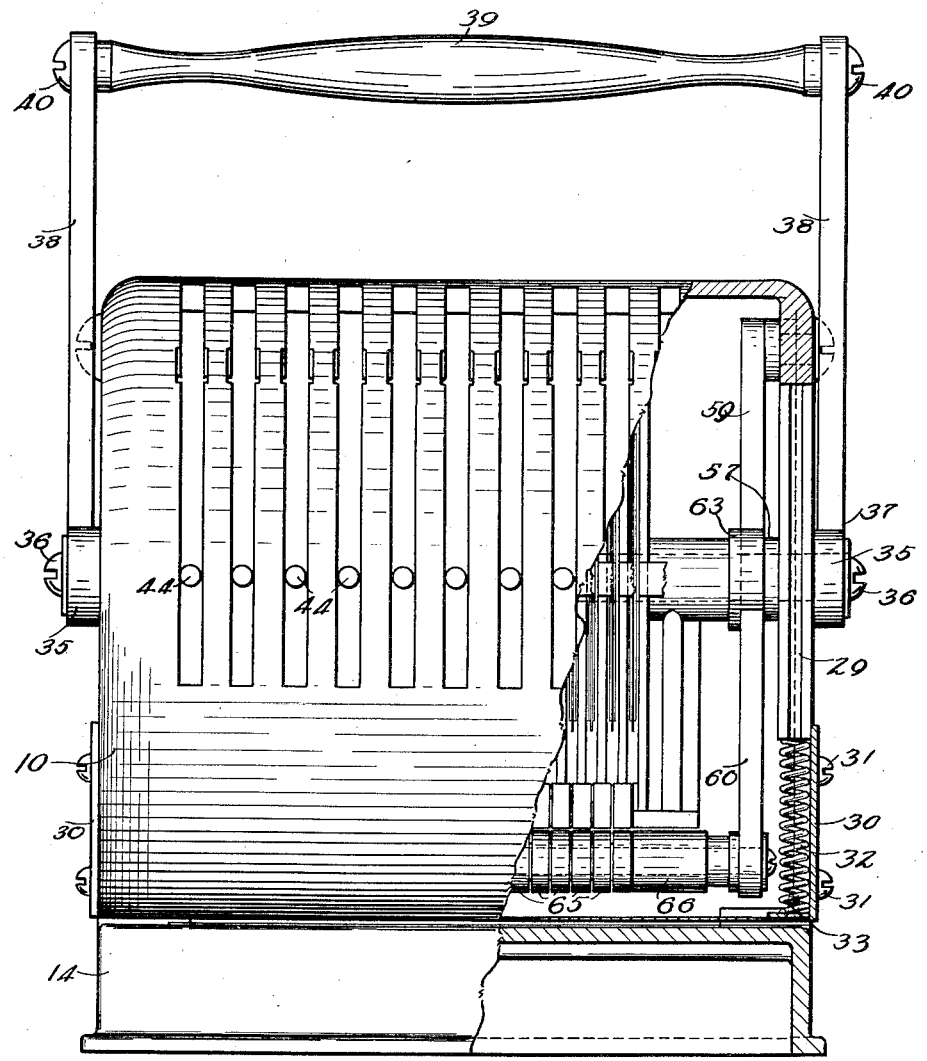

Referring now to these figures our invention proposes an apparatus of this nature including a casing generally indicated at 10, which has a rear storage compartment 11 normally closed by a removable door 12. The lower rear portion of this casing is secured by bolts 13 upon a hollow base 14 the forward portion of whose upper surface constitutes a check support and is provided with a transversely disposed dove tail groove for the reception of a platen including a platen strip 15 of rubber or other relatively soft compressible material held within a carrier 16 formed to fit the base plate groove.

Figure 4:
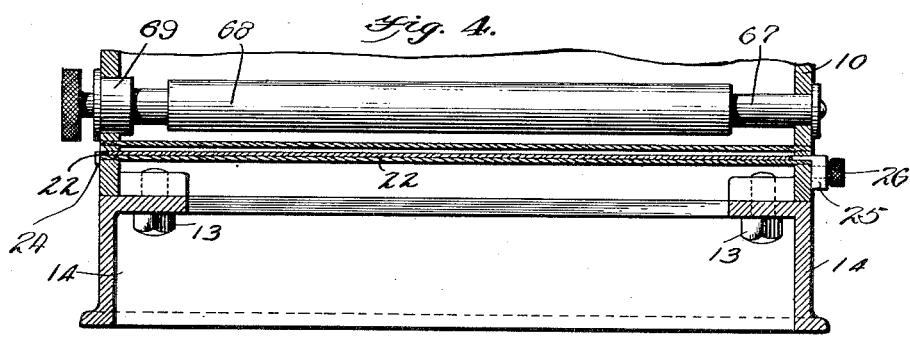
Figure 5:
Fig. 5 is a detail plan view of one of the index strips.

The top of the casing 10 is substantially flat and this casing has a rounded front whose lower edge or portion 17 curves inwardly and rearwardly in spaced relation above the upper surface of the base 14, the side walls of the casing having slots which curve upwardly and rearwardly and open at their lower forward ends into the work receiving space 18 between the base and the lower portion 17 of the casing. These slots receive the side edges of spaced parallel strips 19 and 20 which form guards for the work receiving slots and to which the upper plate 19 is secured at its lower forward portion to the lower edge 17 and has a transversely slotted opening 21 in vertical alinement with the platen strip 15. The lower forward edge of the lower plate 20 is secured to the base 14 rearwardly of the platen as particularly seen in Fig. 1 and is adapted for the reception of a check stop 22 which as best seen in Fig. 4 consists of a strip adapted to be extended transversely of the space between the walls 19 and 20, the strip having a lengthwise upright flange 23 and a downturned flange 24 at one end to engage one side wall of the casing 10, the other end of the strip having an angular connecting piece 25 attached thereto and provided with a small clamping screw 26 threaded therethrough for engagement with the other side wall of the casing in order to lock the stop in the work receiving slot and at various points therealong.

The side walls 27 of the casing 10 are also provided with vertical slots in transverse alinement, extending upwardly from a point above the platen strip 15 and provided with guide ribs 28 slidably disposed within the vertical side slots of slide strips 29, the latter of which in normal position of the parts extends from the upper ends of the vertical slots of the casing to points slightly below the upper edges of side covers 30 attached by screws 31 to the sides of the casing to cover the lower portions of their slots and to protect vertically disposed springs 32 whose lower ends are seated on guide pins 33 and whose upper ends engage the lower ends of the slide strips 29 to normally hold the latter in upper position.

Intermediate their ends the slide strips 29 have bearing openings for the ends of a transversely disposed type disk shaft 34 the outer extremities of which project slightly beyond the sides 27 of the casing 10 and are provided with rollers 35 securely held by screws 36 and engaged by the rounded lower angular portions 37 of side levers 38. The upper ends of these levers extend above the top of the casing 10 and are connected by a transverse handle 39 secured in place by screws 40, and their lower extremities are pivotally connected to the side walls 27 of the casing rearwardly of the slide strips 29 as indicated at 41 in Fig. 1 so that forward and downward movement of the levers 28 will force the type disk shaft 34 downwardly by virtue of the bearing of the levers upon rollers 35, and will consequently force the slide strips 29 downwardly against the tension of springs 32 which serve to restore the parts to their normal upper position when the parts are released. This movement is well illustrated by a comparison of the full and dotted lines in Fig. 1.

Figure 8:
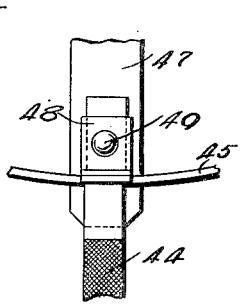
Figs. 7 and 8 are respectively a detail side view and top plan view on an enlarged scale of the connection between each of the type disks, its respective index strip and adjusting handle.
Figure 7:
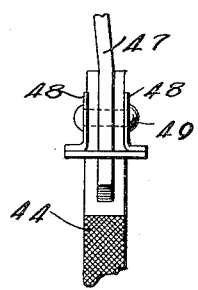
Figure 6:
Fig. 6 is a similar view of the respective type strip.

The upper portion of the front curved section of the casing 10 has a laterally spaced series of vertical slots 42 and the sides of each of these slots are recessed at 43 to form sight openings. Outwardly through the slots 42 project a series of adjusting handles 44, and each of these adjusting handles has, secured at its inner end, a flexible index strip 45 upon which appear a vertical lengthwise series of numerals, letters or symbols, the counter-part in reversed relation with the corresponding type disk 46 to whose radial forwardly projecting arm 47 the inner end of the adjusting handle is also connected as particularly seen in Figs. 7 and 8. As shown in these latter figures in particular and for the above purposes, the inner end of each of the adjusting handles is bifurcated to receive the forward end of the respective type disk arm 47 and the corresponding index strip 45 has side brackets 48 upon its inner surface at the sides of the bifurcated portions of the adjusting handle so that a single rivet 49 connects the index strip handle and type disk arm.

Figure 9:
Fig. 9 is a detail cross section through one of the type disk spacing members.

Each of the type disks is rotatably mounted upon the type disk shaft 34 and centrally apertured for this purpose, each type disk having a lower rear type strip 50 provided with peripheral type 51, and each disk is also provided with a peripheral arcuate notched surface 52 extending along its upper rear portion above the type strip or segment 50. The several type disks are spaced apart by anti-friction means in the nature of spacing disks 53, one of which is shown in Fig. 9, and each of which has a central aperture receiving the shaft and a centrally offset hub portion with an outer oppositely offset rim or flange, these disks being utilized in pairs the inner concave faces of which oppose one another so that in view of the reduced friction and the further frictional holding of the type disks as presently described, each thereof may be independently shifted through its respective adjusting handle 44 without danger of disturbing the other type disks of the series.

In furthering this purpose we provide a horizontal series of stop pins 54 rearwardly of the several type disks, the forward ends of which pins engage the toothed surfaces 52 of the disks and the rear ends of which are slidable through openings in a transversely disposed pin bar 55 having at its rear portion a series of angular springs 56, each anchored at one end upon the pin bar and engaging one of the stop pins 54 at its rear concaved end projecting rearwardly beyond the pin bar. The pin bar 55 is secured at its ends to side bars 57 and the forward ends of these side bars are secured to the inner sides of the slide strips 29 and are apertured to receive the adjacent portions of the type disk shaft 34.

Pivotally mounted at 58 to the upper inner portions of the sides 27 of casing 10, at points rearwardly of the vertical plane of the type disk shaft 34, are a pair of depending side bars 59 forming an inking roller frame, these side bars having curved and laterally offset portions intermediate their ends, forming shoulders beneath the type disk shaft and terminating in lower straight extensions 60 provided with lengthwise slots 61 receiving the ends of a vertically shiftable inking roller shaft 62. The type disk shaft has rollers 63 inwardly beyond the side bars 57 of the stop pin frame, which bear upon the shoulders thus formed in the side arms 59 so that upon downward movement of the type disk shaft as previously described, the side arms 59 of the inking frame will be shifted rearwardly, carrying the inking roller shaft 62 rearwardly and away from contact with the type segments 50 as seen by a comparison of the full and dotted lines in Fig. 1, and against the tension of leaf springs 64 secured to the casing top and depending into engagement with the rear edges of the side arms 59.

The inking roller is made up of a series of rings 65 disposed in independently rotatable relation upon the shaft 62 between sleeves 66, and each of which rings is opposite one of the type disks so that after the several type disks have been properly set, and when the handle 39 is pulled forwardly and downwardly, the inking rings 65 will be rolled rearwardly of the proper portions of the set type segments, the inking roller being under tension of springs 66 disposed in the slots 61 and tending to shift the inking roller vertically into yielding engagement with the type 51. It is thus obvious that as the inking frame has a different arc of movement to that of the type segments, only the lowermost portions of the latter will be engaged and inked, the inking roller moving free of contact with the type segments as it is shifted rearwardly and into engagement with a fountain roller 67 journaled transversely through the lower portions of the frame sides and provided with a soft ink holding surface 68 and with a knurled hand wheel at 69 as shown in Fig. 4 so that it may be rotated from time to time to present a new surface for contact with the inking rings 65.

Thus in operation, with the parts in the position in full lines in Fig. 1, all or selected ones of the type disks 46 may be adjusted independently by grasping their adjusting handles 44 and shifting the same until the desired symbol, letter, name or number of the respective index strip 45 appears in the sight opening formed by the recesses 43. When the type disks have been set as desired it is then simply necessary to grasp the handle 39 and move the same forwardly and downwardly to the dotted line position upon which it is obvious the entire series of type disks will be moved downwardly in a vertical line by virtue of movable contact with the lower angularly curved portions of the side levers 38 with the rollers 35 of the type disk shaft 34, the slide strips 29 constraining this movement to a truly vertical plane. In this way the lowermost downwardly facing type 51 of the several type disks will be shifted downwardly through transverse slots 21 of plate 19 and into engagement with the check or paper to be printed, previously disposed in the work receiving slot 18, with one edge of the paper in engagement with the stop strip 22 which may be properly adjusted so that the printing will be accomplished along a desired line.

It is obvious that, when the handle 39 is pressed forwardly and downwardly, the engagement of the rollers 63 of the type disk shaft 34, engaging the upwardly facing intermediate shoulders of the side arms 59 forming the inking frame, will shift this inking frame rearwardly during which movement the inking rings 65 will be rolled upon the lowermost type of the several segments, supplying the latter with ink so that in their subsequent operation as above described the type will print as well as emboss the work.

It is obvious that in the adjusting of the several type disks, the desired results may be quickly and readily accomplished, as a counter-part of the type segments is exposed to full view of the operator by virtue of the index strips 45, and it is equally obvious that when each type disk is adjusted it will be held in this position against accidental displacement during adjustment of the other type disks as well as during subsequent operation, by virtue of the engagement of the stop pins 54 with the toothed surfaces 52 of the type disks, which engagement is of a sufficient yieldable nature to avoid interference with the actual adjusting operation.

We claim:

1. A machine of the character described including a vertically movable type shaft, a frame in the side portions of which the ends of the type shaft are movable and outwardly beyond which said ends extend, said frame having vertically disposed slots in its forward portion and an open lower portion, a series of type disks independently rotatable on the shaft, a series of type disk adjusting members projecting outwardly through the slots of the frame and movable vertically with the type disk shaft, and an actuating handle having portions to engage the projecting ends of the type disk shaft for the purpose of shifting the same vertically.

2. A machine of the character described including a vertically shiftable type disk shaft, independently rotatable type disks on the shaft, means projecting exteriorly of the frame and movable vertically with the type disk shaft for adjusting the type disks, a base on which the frame is rigidly secured, having a flat supporting surface spaced below the open lower portion of the frame, guides for the type disk shaft movable vertically in the frame, and a handle pivoted to the frame and movably engaging the said shaft.

3. A machine of the character described comprising a frame having vertical slots in its forward portion, a vertically movable type disk shaft in the frame, a handle for moving the type disk shaft, a plurality of independently rotatable type disks on the shaft, each having a type segment, and type disk adjusting arms projecting from the disks and extending externally of the frame through its said slots, each of said arms having an index strip corresponding to the type segment of its respective disk for the purpose described.

4. A machine of the character described including a frame or casing having a series of forward vertical slots, a type disk shaft movable vertically within and across the frame, a plurality of independently rotatable type disks on the shaft, each having a projecting arm and a type segment, handles secured to the type disk arms and projecting exteriorly through the frame slots, flexible index strips within the frame connected to the said handles and each having characters corresponding to the type segment of its respective disk, said frame having recesses intermediate the ends of its slots, forming sight openings to coöperate with the index strips, as described.

5. In a machine of the character described a horizontally disposed vertically movable type disk shaft, a plurality of independently rotatable type disks on the shaft, each having peripheral type carrying portions, a platen in line with the movement of the said shaft, an inking roller normally positioned between the series of type disks and the platen, and a swinging support for the inking roller engageable by the shaft to swing the inking roller out of the path of movement of the series of disks upon movement of the shaft toward the platen.

6. In a machine of the character described a horizontally disposed vertically movable type disk shaft, a plurality of independently rotatable type disks on the shaft, each having peripheral type carrying portions, a platen in line with the movement of the said shaft, and an inking roller normally positioned in engagement with the type disks between the same and the platen and having means engageable by the shaft to shift the same out of the path of movement of the type disks upon movement of the shaft toward the platen.

7. In a machine of the character described a horizontally disposed vertically movable type disk shaft, a plurality of independently rotatable type disks on the shaft, each having peripheral type carrying portions, a platen in line with the movement of the said shaft, and an inking roller normally positioned in engagement with the type disks between the same and the platen and having means engageable by the shaft to shift the same out of the path of movement of the type disks upon movement of the shaft toward the platen, said inking roller having independently revoluble inking surfaces in line with the several type disks.

CHARLES HAMILTON WOLFE
HARRY GEORGE ALLEN.